United States Patent [19]

Schneider et al.

[11] Patent Number: 5,799,999

[45] Date of Patent: Sep. 1, 1998

[54] MAGNETIC RETRIEVING TOOL

[75] Inventors: Cyril B. Schneider, Grover Beach; Kent D. Foreman, Tipton; Philip L. Flynt, Tulare, all of Calif.

[73] Assignee: Cheyenne Tool, LLC, Tulare, Calif.

[21] Appl. No.: 966,734

[22] Filed: Nov. 10, 1997

[51] Int. Cl.[6] .................................................. B25J 15/06
[52] U.S. Cl. ............................................................ 294/65.5
[58] Field of Search ............................... 294/19.1, 64.1, 294/65.5; 335/285, 291, 293, 295–298, 302

[56] References Cited

U.S. PATENT DOCUMENTS

| | | | |
|---|---|---|---|
| 2,656,211 | 10/1953 | Zachary | 294/65.5 |
| 2,693,979 | 11/1954 | Russell | 294/65.5 |
| 2,976,075 | 3/1961 | Budreck | 294/65.5 |
| 2,993,723 | 7/1961 | Twachtman et al. | 294/65.5 |
| 4,813,729 | 3/1989 | Speckhart | 294/65.5 |
| 5,265,887 | 11/1993 | Stelmach | 294/65.5 |

Primary Examiner—Johnny D. Cherry
Attorney, Agent, or Firm—Daniel C. McKown

[57] ABSTRACT

The magnet is mounted on a carrier that can be extended from and retracted into a magnetic shield that is affixed to the distal end of an extended hollow flexible tube. A stiff control wire is connected at its distal end to the magnet carrier, and its proximal end is connected to a knob that is moved distally with respect to the hollow flexible tube to push the magnet carrier partially out of the magnetic shield thereby exposing the magnet for use. A soft steel insert is bonded to the proximal side of the magnet, and its presence increases the pulling force of the magnet by 12 to 15 percent. At the proximal end of the tool, a compression spring acting between the hollow flexible tube and the knob keeps the magnet biased within its magnetic shield. When the magnet has been exposed by pushing the control knob in a distal direction, the magnet can be locked in the exposed position by a simple latch that prevents inadvertent withdrawal of the magnet after the sought-after object has been acquired.

3 Claims, 1 Drawing Sheet

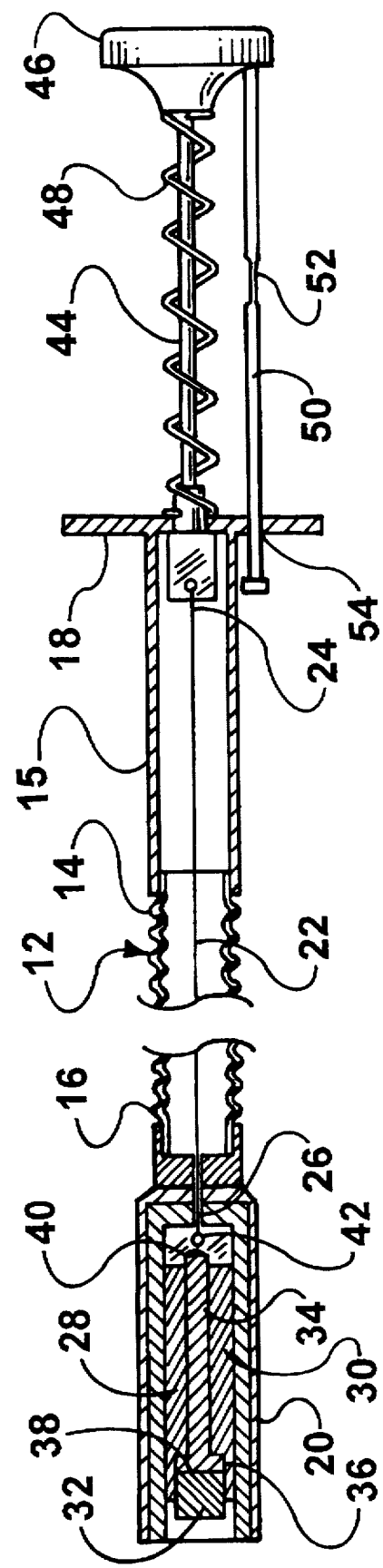

MAGNETIC RETRIEVING TOOL

CROSS REFERENCE TO RELATED APPLICATIONS

Not applicable.

STATEMENT RE FEDERALLY SPONSORED RESEARCH OR DEVELOPMENT

Not aplicable.

REFERENCE TO A "MICROFICHE APPENDIX"

Not applicable.

BACKGROUND OF THE INVENTION

1. Field of the Invention

The present invention is in the field of magnetic retrieving tools and specifically refers to a device for capturing and recovering ferromagnetic objects from locations having limited access, such as drain pipes.

2. The Prior Art

The present invention is concerned with improvements to magnetic retrieving tools, which improvements solve certain problems inherent in prior art devices.

Magnetic retrieving tools are known in which a permanent magnet is maintained within a shield at one end of the tool until the operator chooses to expose the permanent magnet by pushing it out of its shield by the use of a stiff wire that extends through a flexible hollow outer tube. The stiff wire typically terminates at the proximal end (nearest the user) of the tool in a knob that is pushed or pulled by the operator.

Although this basic configuration has been known for some time, it is not without certain problems. For example, once the sought-after object has been acquired, care must be taken so as not to inadvertently pull on the control wire because this would retract the magnet back into its shield, which would probably result in loss of the object.

Another problem with conventional magnetic retrieving tools has become more serious with the advent of very powerfull rare earth permanent magnets. Such magnets were typically bonded to a carrier at the distal end of the stiff control wire. Such magnets attach themselves very tightly to ferromagnetic objects. If the sought-after object has become lodged in an unyielding situation, pulling on the stiff control wire sometimes resulted in the magnet coming loose from its carrier and thereby being lost.

A related problem was the possibility that the stiff control wire would pull loose from the magnetic carrier.

The improvements which constitute the present invention are believed to solve these problems associated with prior art magnetic retrieving tools, as will be described below.

BRIEF SUMMARY OF THE INVENTION

It is a first object of the present invention to provide a magnetic retrieving tool in which the operator cannot inadvertently retract the permanent magnet into the magnetic shield thereby losing the sought-after object.

It is a second object of the present invention to provide a magnetic retrieving tool in which the magnet is held within its carrier by magnetic attraction in addition to the strength of the bonding material used.

It is a third object of the present invention to provide a magnetic retrieving tool in which the control wire is less likely to come loose from the magnetic carrier.

It is a fourth object of the present invention to provide a magnetic retrieving tool in which the strength of the magnet is increased by the use of a soft steel insert that is located on the proximal side of the magnet.

In accordance with the present invention, a latching device is provided at the proximal end of the tool, whereby the magnet, after having been extended to an exposed position, can be latched in the exposed position for the remainder of the retrieving operation.

In accordance with the present invention, a soft steel insert having generally the shape of a nail is bonded to the proximal side of the magnet and is also bonded to the magnet carrier. The head portion of the nail-shaped insert is in contact with the permanent magnet, while the tip of the nail-shaped insert points in the proximal direction. It is has been found through experiment that this soft steel insert increases the pulling force of the magnetic by 12 to 15 percent. In addition, the extremely strong magnetic attraction between the soft steel insert and the magnet augments the holding power of the bonding material used to bond them together, and thus the magnet is less likely to pull loose from the carrier. Further, the tip end of the nail-shaped soft steel insert lies adjacent the distal end of the control wire in accordance with the present invention, and the magnetic attraction between the soft steel insert and the control wire helps to prevent the control wire from coming loose from the magnet carrier.

The novel features which are believed to be characteristic of the invention, both as to structure and method of operation, together with further objects and advantages thereof, will be better understood from the following description considered in connection with the accompanying drawings in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

The drawing is a fractional side elevational view partly in cross section showing a preferred embodiment of the magnetic retrieving tool of the present invention.

DETAILED DESCRIPTION OF THE INVENTION

In the following paragraphs a preferred embodiment of the present invention will be described in detail by way of example.

Like other instruments of its kind, the magnetic retrieving tool of the present invention includes an elongated hollow flexible tube 12 that is stiff enough to support compression and to withstand tension, but which is sufficiently flexible to bend. The hollow flexible tube 12 includes a proximal end 14 and a distal end 16. The proximal end 14 is terminated in a short tube 15 having a flange 18 extending radially from its proximal end. A magnetic shield 20 is affixed to the distal end 16 of the tube 12.

A control wire 22 extends within the hollow flexible tube 12 and includes a proximal end 24 and a distal end 26. The control wire 22 is stiff enough to transmit forces in a lengthwise direction, but is flexible enough to bend with the tube 12.

The distal end 26 of the control wire 22 is attached to a magnet carrier 28 that is movable axially within the magnetic shield 20 in response to forces applied by the control wire 22.

The magnet carrier 28 includes a hollow body of aluminum 30 that contains a magnet 32 and a soft steel insert 34. The soft steel insert is attached magnetically to the proximal side 38 of the magnet 32 and is shaped roughly like a nail. The head 36 of the soft steel insert 34 is strongly drawn against the proximal side 38 of the magnet 32, while the tip 40 of the soft steel insert points in the proximal direction. The magnet carrier 28 further includes a hole 42 through which the control wire 22 is threaded and secured. The magnet carrier 28 is freely slidable within the magnetic shield 20. The soft steel insert 34 and the magnet 32 are bonded to the aluminum magnet carrier 28 using an epoxy type adhesive.

A ferromagnetic object that is being retrieved may be heavy, or it may have become stuck in its surroundings. In either event, the operator must pull on the flange 18 in an effort to move the ferromagnetic object.

The same force that is exerted on the object is also working to pull the magnet 32 loose from the soft steel insert 34, the latter being very securely attached to the carrier thanks to the shear strength of the adhesive bond between them. The force between the magnet 32 and the ferromagnetic object is not able to exceed the force between the magnet 32 and the soft steel insert 34, due to the superior contact between the latter.

The attractive force between the magnet 32 and the soft steel insert 34 must be overcome before any tension is applied to the bonding material between those parts. Thus, it is fair to say that the magnetic attraction between the magnet and the soft steel insert augments the strength of the adhesive bond between those parts. It is also clear that the magnet 32 can not be pulled loose by the ferromagnetic object that is being retrieved.

At the proximal end 14 of the tube 12 a rod 44 extends through a hole in the flange 18, and the control wire 22 is attached to the distal end of the rod 44. A knob 46 is attached to the proximal end of the rod 44 to assist the operator in controlling it. A compression spring 48 bears against the flange 18 and against the knob 46 pushing them apart and maintaining a tension in the control wire 22, thereby keeping the magnet 32 drawn into the magnet shield 20.

A latch 50 is attached to the knob 46 and extends distally from it. The latch 50 includes a narrow portion 52 that the operator can selectively insert into the smaller end of a key hole shaped hole 54 in the flange to hold the knob in a depressed position. This keeps the magnet 32 from inadvertently being withdrawn into the magnetic shield 20 after the sought-after object has been acquired by the magnet 32.

In use, the magnet shield 20, followed by the hollow flexible tube 12, is inserted into the pipe or passage thought to contain the object to be retrieved. When the operator believes the magnet is approaching the proximity of the object to be retrieved, the operator pushes the knob 46 toward the flange 18. This push and displacement are transmitted through the control wire 22 to the magnet carrier 28 which thereby is pushed, at least partially, out of the magnet shield 20. This exposes at least a part of the magnet 32, and ferromagnetic objects in its vicinity will be attracted to it. If desired, the operator may choose to latch the knob 46 in the depressed position using the latch 50 in the manner described above. After the hollow flexible tube 12 has been inserted as far as possible into the pipe or passage, the operator withdraws it from the pipe or passage and checks to see whether the sought-after object has been retrieved. Thereafter, at the operator's convenience, the knob 46 is unlatched from its depressed position so that the magnet will withdraw into the magnetic shield so that it will not inadvertently pick up objects that are not desired.

Thus, there has been described a magnetic retrieving tool in which the magnet is held within its carrier by magnetic attraction in addition to the strength of the bonding used, in which the control wire is less likely to become loose from the magnetic carrier, in which the attractive force of the magnet is increased by the use of a soft steel insert, and in which a latch is provided to prevent inadvertent retraction of the magnet into the magnetic shield after the sought-after object has been retrieved.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A magnetic retrieving tool for capturing and recovering ferromagnetic objects in limited access locations comprising:

a flexible hollow tube having a proximal end and a distal end, and having a flange extending radially from its proximal end;

a control wire extending through said flexible hollow tube and having a proximal end and a distal end;

a magnetic shield affixed to the distal end of said flexible hollow tube and having a hollow cylindrical shape;

a permanent magnet having a proximal surface and a distal surface; and, a magnet carrier retaining said magnet, located within said magnetic shield and attached to the distal end of said control wire, movable with respect to said magnetic shield in response to movement of said control wire from a retracted location within said magnetic shield to an exposed location in which at least a portion of said magnet extends outside of said magnetic shield, said magnet carrier further including a soft steel insert bonded to and attracted magnetically to the proximal surface of said magnet and extending proximally from said magnet within said magnet carrier.

2. The magnetic retrieving tool of claim 1, further comprising:

a control handle located proximally of the proximal end of said flexible hollow tube and including handle means attached to the proximal end of said control wire for applying pushing and pulling forces to said control wire under control of an operator; and, biasing means connected between the proximal end of said flexible hollow tube and said handle means for maintaining a yieldable pulling force on said control wire.

3. The magnetic retrieving tool of claim 1, further comprising:

a control handle located proximally of the proximal end of said flexible hollow tube and including handle means attached to the proximal end of said control wire for applying pushing and pulling forces to said control wire under control of an operator;

biasing means connected between the proximal end of said flexible hollow tube and said handle means for maintaining a yieldable pulling force on said control wire; and, latching means attached to said handle means and movable by the operator to releasably engage the flange of said flexible hollow tube to prevent inadvertent retraction of said magnet into said magnetic shield.

* * * * *